US010116450B1

(12) United States Patent
Brown et al.

(10) Patent No.: US 10,116,450 B1
(45) Date of Patent: Oct. 30, 2018

(54) MERKLE SIGNATURE SCHEME USING SUBTREES

(71) Applicant: ISARA Corporation, Waterloo (CA)

(72) Inventors: Michael Kenneth Brown, Fergus (CA);
Anthony Chun Li Hu, Kitchener (CA);
Marek Paruzel, Kitchener (CA);
Atsushi Yamada, Toronto (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

(21) Appl. No.: 15/341,499

(22) Filed: Nov. 2, 2016

(51) Int. Cl.
*H04L 9/32* (2006.01)

(52) U.S. Cl.
CPC .......... *H04L 9/3247* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 4,309,569 A | 1/1982 | Merkle | |
| 5,432,852 A * | 7/1995 | Leighton | ............... H04L 9/3236 380/30 |
| 6,826,687 B1 * | 11/2004 | Rohatgi | .................. G06Q 40/04 380/277 |
| 2008/0175392 A1 * | 7/2008 | Ogura | ...................... H04K 1/00 380/278 |
| 2008/0256631 A1 * | 10/2008 | Zvi | .......................... G06F 21/56 726/22 |
| 2012/0096252 A1 * | 4/2012 | Arditti | .................. G06F 9/4406 713/2 |
| 2013/0142328 A1 * | 6/2013 | Shibata | ................. H04L 9/0656 380/28 |
| 2013/0159730 A1 * | 6/2013 | Asim | .................... H04L 9/3255 713/189 |
| 2014/0086412 A1 * | 3/2014 | Shibata | ................. H04L 9/0656 380/255 |

(Continued)

OTHER PUBLICATIONS

Menezes et al.; Handbook of Applied Cryptography; Chapter 11,; CRC Press 1997 (65 pages).

(Continued)

*Primary Examiner* — Henry Tsang
(74) *Attorney, Agent, or Firm* — Henry Patent Law Firm PLLC

(57) ABSTRACT

In a general aspect, a Merkel signature scheme (MSS) uses subtree data. In some aspects, subtree data is loaded from a non-volatile memory into a volatile memory. The subtree data represents one or more nodes of a subtree of a cryptographic hash tree and a first authentication path portion that includes nodes outside the subtree. The subtree includes a subtree root node at a level below a root node of the cryptographic hash tree and lowest-level nodes of the cryptographic hash tree, which are based on respective verification keys for a one-time signature (OTS) scheme. An OTS is generated using a first signing key associated with a first verification key, which is associated with a lowest-level node in the subtree. The OTS, the first verification key, the first authentication path portion, and a second authentication path portion comprising one or more nodes of the subtree are sent to a recipient.

31 Claims, 4 Drawing Sheets

(56) References Cited

U.S. PATENT DOCUMENTS

2015/0244524 A1* 8/2015 Pulkus .................. H04L 9/003
                                                              380/28

OTHER PUBLICATIONS

Bernstein et al.; Post-Quantum Cryptography; 2009 (248 pages).
McGrew et al.; Hash-Based Signatures; Crypto Forum Research Group Internet-Draft; Mar. 2016 (43 pages).
Buchmann et al.; A Practical Forward Secure Scheme based on Minimal Security Assumptions; Sep. 2013 (115 pages).
Huelsing et al.; XMSS: Extended Hash-Based Signatures; Crypto Forum Research Group Internet-Draft; Feb. 2016 (56 pages).
McGrew et al.; State Management for Hash Based Signatures; Sep. 2016 (18 pages).
Wikipedia, Merkle Signature Scheme, Feb. 2016 (3 pages).
Aysu, Aydin, et al., "Precomputation Methods for Faster and Greener Post-Quantum Cryptography on Emerging Embedded Platforms", Cryptology ePrint Archive: Report 2015/288, Mar. 2015, 24 pages.
Buchmann, Johannes, et al., "Merkle Tree Traversal Revisited", Post Quantum Crypography, vol. 5299 of Lecture Notes in Computer Science, pp. 63-78, Springer Berlin/Heidelberg, 2008, 13 pages.
Eisenbarth, Thomas, et al., "A Performance Boost for Hash-Based Signatures", Number Theory and Cryptography, vol. 8260, pp. 166-182, Springer Berlin/Heidelberg, 2013, 17 pages.
McGrew, David, et al., "Hash-Based Signatures", Crypto Forum Research Group Internet-Draft, Jun. 2017, 45 pages.
Szydlo, Michael, "Merkle Tree Traversal in Log Space and Time", The Advances in Cryptology, Eurocrypto 2004, vol. 3027, pp. 541-554, 2004, 17 pages.

* cited by examiner

MERKLE SIGNATURE SCHEME USING SUBTREES

BACKGROUND

The following description relates to Merkle signature schemes (MSS).

Cryptosystems are used to communicate securely over public channels. Some cryptosystems provide authenticity through the use of digital signatures. An MSS may utilize a cryptographic hash tree (e.g., a Merkle tree) and one-time signatures (OTS) to generate and verify a number of digital signatures for one public key.

DETAILED DESCRIPTION

Figure 1:
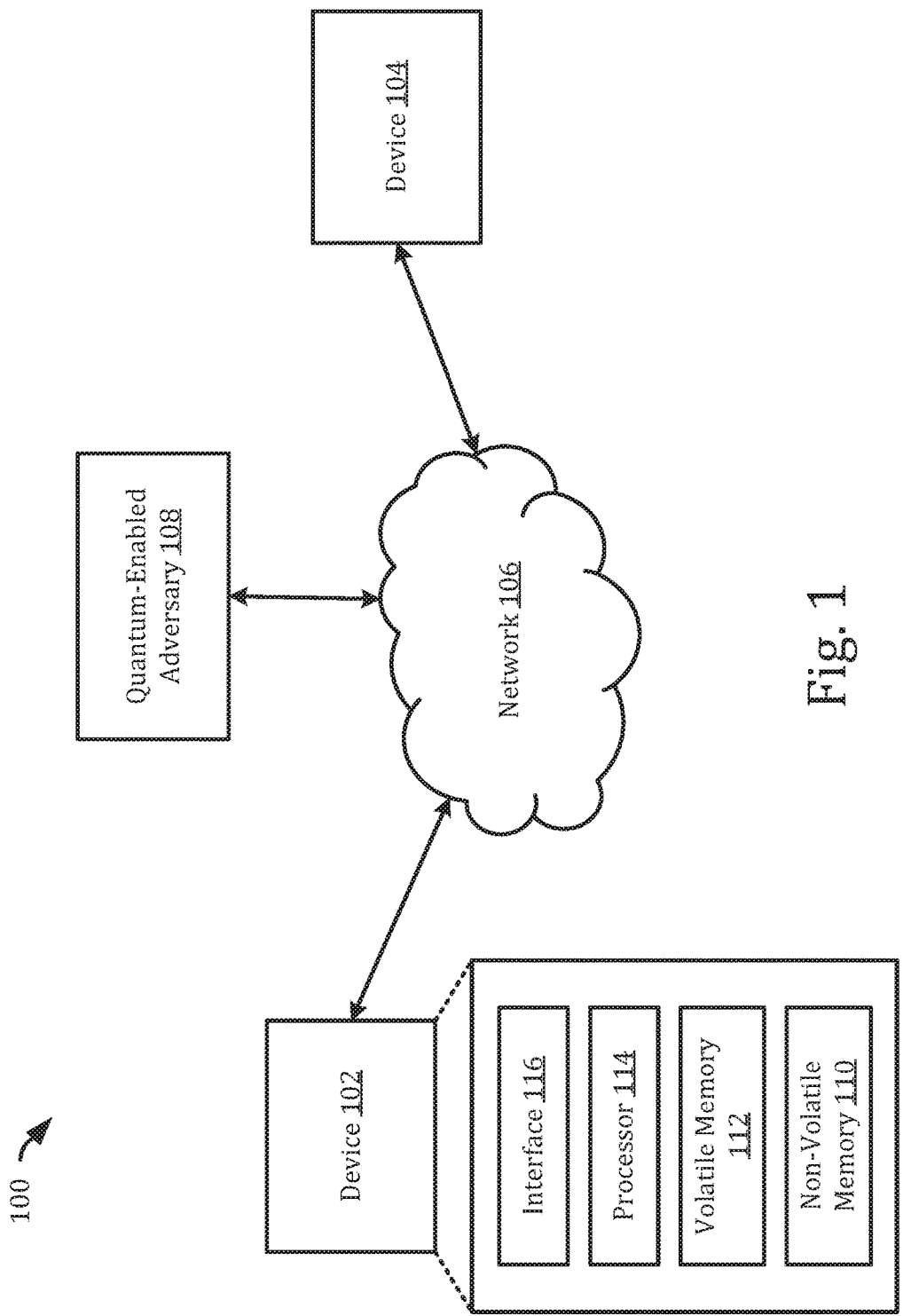
FIG. 1 is a block diagram showing aspects of an example communication system.

In aspects of what is described here, a Merkle signature scheme (MSS) utilizes a cryptographic hash tree and one-time signatures (OTS) to generate and verify digital signatures in a communication system. A cryptographic hash tree may be implemented by a binary tree whose nodes are based on outputs of hash functions. Each node of the cryptographic hash tree may be based on the output of a hash function applied to a combination of the two nodes immediately below it. The hash function may be any suitable hash function, and may be publicly-known. The hash function may be applied to the combination of the two lower-level nodes in any suitable manner. As an example, the hash function may be applied to a concatenation of the lower level nodes (e.g., as in a Merkle tree). The cryptographic hash tree may be based on verification keys of an OTS scheme. In some aspects, the MSS scheme may use a cryptographic hash tree that is based on verification keys of a Lamport-Diffie OTS scheme, a Winternitz OTS scheme, or another type of OTS scheme.

In some aspects, subtree data representing a subtree of a cryptographic hash tree is loaded into volatile memory from non-volatile memory along with a first authentication path portion that includes one or more nodes of the cryptographic hash tree outside the subtree. The subtree includes a subtree root node at a cut-off level (which is below the root node of the cryptographic hash tree) and the nodes of the cryptographic hash tree below the subtree root node (including lowest-level nodes of the cryptographic hash tree). The first authentication path portion includes nodes of the cryptographic hash tree outside the subtree. For instance, the first authentication path portion may include a subtree root node of another subtree, and may also include additional nodes of the cryptographic hash tree at one or more levels above the subtree root node. The lowest-level nodes of the cryptographic hash tree (and thus, each of the subtrees) are based on a set of verification keys for an OTS scheme. Each verification key is associated with a respective signing key of the OTS scheme. A message is digitally signed using one of the signing keys (by generating a OTS using the signing key), and the digital signature is sent to a recipient. The digital signature may include the OTS generated using the chosen signing key, an index indicating that the chosen signing key was used to generate the OTS, a verification key associated with the chosen signing key, the first authentication path portion, and a second authentication path portion that includes one or more nodes of the subtree.

The public key for an MSS includes one or more nodes in the cryptographic hash tree. The public key may include a highest-level node used to authenticate a verification key of the MSS. In some aspects, the public key for the MSS includes a single node of the cryptographic hash tree (e.g., the public key is the root node of the cryptographic hash tree). In some aspects, the public key for the MSS includes multiple nodes of the cryptographic hash tree. For example, the public key may be the entire top portion of the cryptographic hash tree at and above the subtree root nodes. As another example, the public key may be a subset of the top portion the cryptographic hash tree (e.g., the public key is the root node of the cryptographic hash tree and the subtree root nodes). In some aspects, the public key node that is used for authentication may depend on which verification key is being authenticated (and thus, which subtree is being used). For example, if a particular verification key is being authenticated, the subtree root node for the subtree associated with that verification key may be the public key node used to authenticate the verification key.

In some aspects, upon receiving the digital signature, a recipient may verify the OTS using the verification key in the digital signature. The recipient may also authenticate the verification key (to ensure it is a legitimate verification key for the MSS) by applying a hash function one or more times to the verification key (with the number of times the hash function is applied being based on the cryptographic hash tree). Applying the hash function one or more times may include applying a hash function to the verification key to yield a first output, and applying a hash function to the first output concatenated with a node of the cryptographic hash tree. The result of applying the hash function one or more times may be compared to the value of a public key node (e.g., the root node of the cryptographic hash tree or another node of the cryptographic hash tree at or above the subtree root node) for authentication.

Aspects of the present disclosure may provide one or more advantages. For example, some aspects may allow for subtree data (representing a subtree of the cryptographic hash tree) to be loaded into volatile memory instead of the full cryptographic hash tree. This may reduce the usage of volatile memory resources during implementation of an MSS, as signing and verification keys for the MSS and cryptographic hash trees with many levels may occupy a substantial amount of space in volatile memory. For example, signing and verification keys for a Lamport-Diffie OTS scheme may each comprise 16,384 bytes (or 16 kB) of data, and the cryptographic hash tree may include approximately $n = \sum_{i=0}^{h} 2^i = 2^{h+1} - 1$ different nodes, where h represents the height of the cryptographic hash tree (or number of levels in the cryptographic hash tree). Assuming the cryptographic hash tree has 20 levels and the hash function used to generate the nodes of the cryptographic hash tree is the SHA-256 function (so each node is approximately 32 bytes), all of the signing and verification keys along with the cryptographic hash tree would consume approximately 16 GB of data.

As another example, subtree data may be loaded into volatile memory without the need to synchronize the state of which signing/verification key pairs associated with the subtree have been used. This may avoid the need for complicated and slow state synchronization m units. In addition, loading subtree data into volatile memory instead of the full cryptographic hash tree may also allow for the subtrees to be used independently of one another. For example, in a distributed computing scheme with multiple computational units, each computational unit may load and use subtree data for different subtrees independently of the other computational units.

As another example, some aspects of the present disclosure may allow for smaller digital signatures by having a public key that includes multiple nodes of the cryptographic hash tree (e.g. the subtree root nodes and above) rather than just the root node of the cryptographic hash tree. The public key may be the entire top portion of the cryptographic hash tree at and above a cut-off level (e.g., all nodes from the subtree root nodes up to the root node of the cryptographic hash tree), or may include only a subset of the nodes of the cryptographic hash tree above the cut-off level (e.g., just the subtree root nodes and the root node of the cryptographic hash tree). Some aspects may also reduce bandwidth consumption of an MSS by sending the public key with multiple nodes of the cryptographic hash tree to a verifier once, potentially eliminating the need to send nodes residing in the public key as part of the authentication path in each digital signature. For instance, the public key may be pre-distributed to a recipient before signed messages are sent to the recipient, rather than having the sender include the nodes of the public key each time it sends a message to the recipient. In such instances, the public key may be relatively large.

FIG. 1 is a block diagram showing aspects of an example communication system 100. The example communication system 100 shown in FIG. 1 includes two devices 102, 104. The devices use a cryptographic scheme to communicate with each other over a network 106. In the example shown, a quantum-enabled adversary 108 has access to the network 106, information exchanged on the network 106, or both. In some instances, the quantum-enabled adversary 108 can transmit or modify information on the network 106. The communication system 100 may include additional or different features, and the components in a communication system may be configured to operate as shown in FIG. 1 or in another manner.

In some implementations, devices in the communication system 100 may have a server-client relationship. For example, the device 102 can be a server and the device 104 can be its client, or vice-versa. In some implementations, devices in the communication system 100 may have a peer-to-peer relationship. For example, the devices 102, 104 can be peers in a served network, in a peer-to-peer network or another type of network. Devices may have another type of relationship in the communication system 100.

In the example shown in FIG. 1, the example devices 102, 104 each have computational resources (e.g., hardware, software, firmware) that are used to communicate with other devices. In some implementations, devices in the communication system 100 can be implemented in various systems, such as, for example, laptops, desktops, workstations, smartphones, tablets, personal digital assistants, servers, server clusters, mainframes, and other types of computer systems. As shown in FIG. 1, the example device 102 includes a non-volatile memory 110, a volatile memory 112, a processor 114, and an interface 116. Each of the devices 102, 104 may include the same, additional or different components. The devices 102, 104 may be configured to operate as shown and described with respect to FIG. 1 or in another manner.

The example non-volatile memory 110 may include a computer-readable storage medium that may store data that persists after power is removed therefrom. For example, data stored in the non-volatile memory 110 may be retrievable after a power cycle of the device 102 (e.g., an unexpected loss of power to the device 102 or to the non-volatile memory 110 itself, or a purposeful reboot of the device 102). The non-volatile memory 110 may be used by the device 102 as secondary memory (e.g., memory that is not directly accessible by the processor 114), and may be used for long-term persistent storage of data. The non-volatile memory 110 can include, for example, a storage device (e.g., a read-only memory (ROM), flash memory, optical disks), a hard disk drive (HDD), or another similar type of non-volatile storage medium.

The example volatile memory 112 may include a computer-readable storage medium that may store data only when power is applied thereto. For example, data stored in the volatile memory 112 may be lost rapidly or immediately following an unexpected loss of power to the device 102 or to the volatile memory 112 itself. The volatile memory 112 may be used by the device 102 as primary memory (e.g., memory that is directly accessible by the processor 114), and may be used to store instructions accessed and executed by the processor 114. The volatile memory 112 can include, for example, certain types of random access memory (RAM), such as dynamic RAM (e.g., dynamic double data rate synchronous dynamic RAM (DDR SDRAM)).

Instructions (e.g., computer code, a computer program, etc.) associated with an operating system, computer applications, or other resources may be stored on non-volatile memory 110, the volatile memory 112, or a combination thereof. In addition, the non-volatile memory 110, the volatile memory 112, or a combination thereof can also store application data and data objects that can be interpreted by one or more applications or virtual machines running on the device 102. The device 102 can be preprogrammed, or it can be programmed (and reprogrammed), by loading a program from another source (e.g., from a removable memory device, from a remote server, from a data network, or in another manner). In some cases, the non-volatile memory 110, the volatile memory 112, or a combination thereof stores computer-readable instructions for software applications, scripts, programs, functions, executables or other modules that are interpreted or executed by the processor 114. For example, the computer-readable instructions can be configured to perform one or more of the operations shown in FIG. 4 and described further below.

In the example device 102 shown in FIG. 1, the processor 114 can execute instructions, for example, to generate output data based on data inputs. For example, the processor 114 can run computer programs by executing or interpreting the software, scripts, programs, functions, executables, or other modules stored in the non-volatile memory 110, the volatile memory 112, or a combination thereof. In some instances, the processor 114 may perform one or more of the operations shown in FIG. 4 and described further below.

The example processor 114 shown in FIG. 1 can include one or more chips or chipsets that include analog circuitry, digital circuitry or a combination thereof. In some cases, the processor 114 includes multiple processor devices such as, for example, one or more main processors and one or more co-processors. For instance, the processor 114 may include a main processor that can delegate certain computational tasks to a cryptographic co-processor, which may be configured to perform the computational tasks more efficiently than the main processor or in parallel with other computational tasks performed by other processor devices. In some instances, the processor 114 coordinates or controls operation of other components of the device 102, such as, for example, user interfaces, communication interfaces, peripheral devices and possibly other components.

In the example device 102 shown in FIG. 1, the interface 116 provides communication with other devices (e.g., via network 106). In some cases, the interface 116 includes a wireless communication interface that provides wireless communication using various wireless protocols or standards. For example, the interface 116 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 116 includes a wired communication interface (e.g., USB, Ethernet) that can be connected to one or more input/output devices, such as, for example, a keyboard, a pointing device, a scanner, or a networking device such as a switch or router, for example, through a network adapter.

The example network 106 can include all or part of a connector, a data communication network or another type of communication link. For example, the network 106 can include one or more wired or wireless connections, one or more wired or wireless networks or other communication channels. The network 106 may have any spatial distribution. The network 106 may be public, private, or include aspects that are public and private. For instance, in some examples, the network 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptosystems are known to be insecure against an attacker armed with a scalable quantum computer. The threat of quantum computers to public key cryptography can be mitigated by switching to other public key cryptosystems that are believed to be invulnerable to quantum attack. For example, certain hash-based signature schemes have been proposed as quantum-resistant replacements for certain RSA-based or ECC-based cryptosystems that are believed to be quantum-vulnerable.

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner. Accordingly, the example quantum-enabled adversary 108 can compromise the security of certain quantum-vulnerable cryptosystems (e.g., by computing a private key of a certificate authority or other entity based on public information).

The example quantum-enabled adversary 108 shown in FIG. 1 can access information exchanged on the network 106. For example, the quantum-enabled adversary 108 may access some or all of the information exchanged between the devices 102, 104. In some instances, the quantum-enabled adversary 108 can directly observe correspondence on the network 106; in some instances, the quantum-enabled adversary 108 indirectly obtains such correspondence, for example, by receiving information observed on the network 106 by another entity or system.

In some implementations, the quantum-enabled adversary 108 can factor integers, compute discrete logarithms or perform other classically-hard computational tasks fast enough to compromise the security of certain cryptosystems. For example, the quantum-enabled adversary 108 may be capable of computing prime factors fast enough to compromise certain RSA-based cryptosystems or computing discrete logarithms fast enough to compromise certain ECC-based cryptosystems.

In the example shown in FIG. 1, the devices 102, 104 may use a quantum-resistant cryptosystem that cannot be compromised by the example quantum-enabled adversary 108. For instance, the devices 102, 104 may communicate using a cryptosystem that is secure against a quantum computer that can efficiently execute Shor's algorithm or other types of algorithms that are known to compromise the security of certain conventional cryptography standards.

In some implementations, the devices 102, 104 use a digital signature scheme that allows each node to verify the sender of messages received. The devices 102, 104 can use the example techniques shown in or described with respect to any one or more of FIGS. 2-4; or the devices 102, 104 may use variations of these and other techniques to communicate in the network 106.

In some implementations, the devices 102, 104 use an MSS in their communications over the network 106. The MSS may utilize an OTS scheme and a cryptographic hash tree to generate and verify digital signatures. Examples of OTS schemes that may be used with an MSS include a Lamport-Diffie OTS scheme and a Winternitz OTS scheme.

Figure 2:
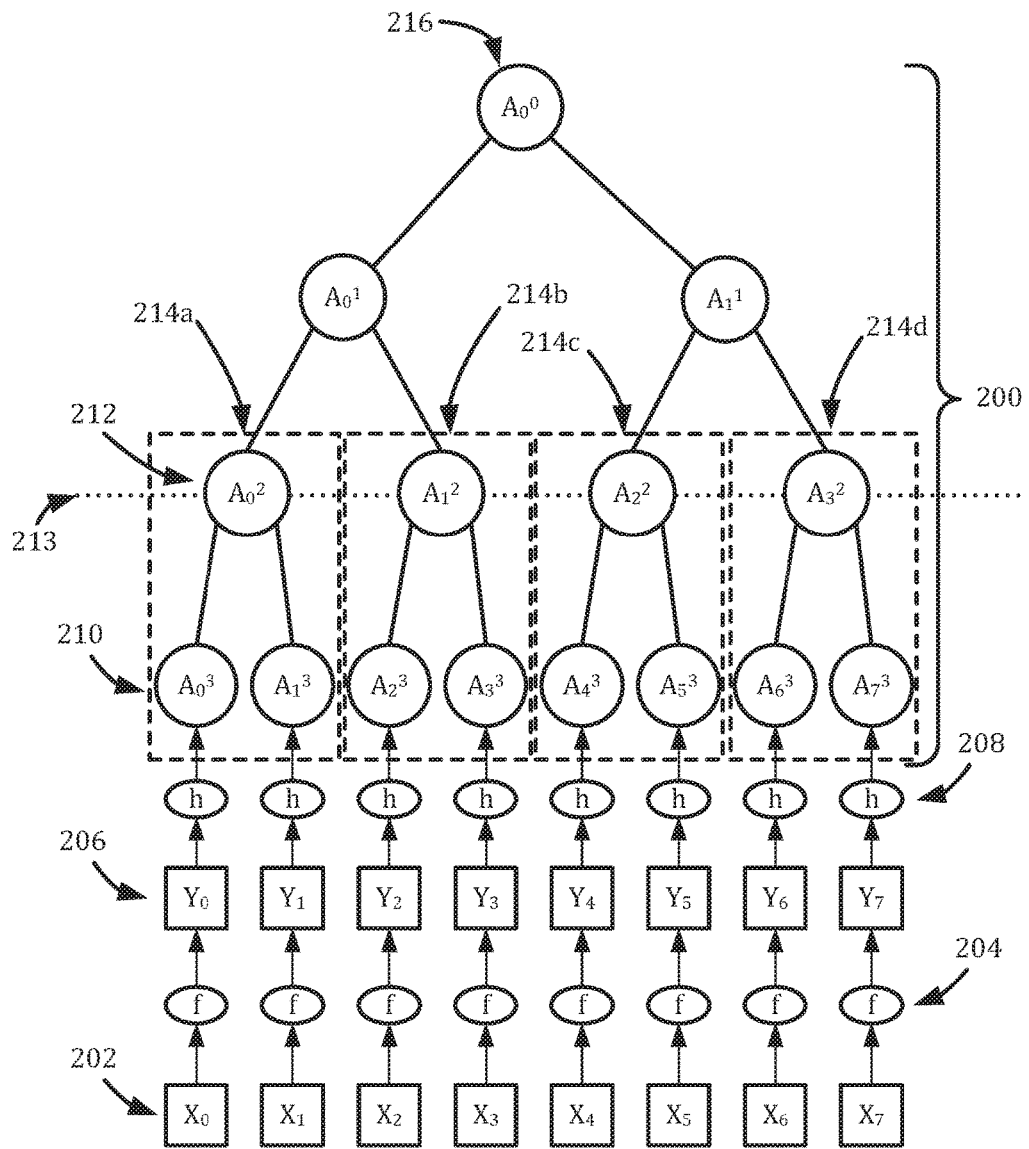
FIG. 2 is a diagram showing an example cryptographic hash tree 200 for use with an MSS.

FIG. 2 is a diagram showing an example cryptographic hash tree 200 for use with an MSS. In the example shown, the cryptographic hash tree 200 is based on verification keys for an OTS scheme. Each node of the cryptographic hash tree 200 of FIG. 2 is designated with a subscript numeral and a superscript numeral, where the superscript numeral denotes the level l of the node within the cryptographic hash tree and the subscript numeral denotes the position of the node in the level l of the cryptographic hash tree. In the example shown, lower level nodes of the cryptographic hash tree 200 are designated with higher superscript numerals, and higher level nodes of the cryptographic hash tree 200 are designated with lower superscript numerals. For instance, in the example shown, the lowest level of the cryptographic hash tree 200 is designated as l=3, and the highest level of the cryptographic hash tree 200 is designated as l=0. The root node 216 of the cryptographic hash tree 200 ($A_0^0$ in FIG. 2) resides at the top of the cryptographic hash tree 200.

As shown in the illustrated example, the lowest-level nodes 210 of the cryptographic hash tree 200 (those at the lowest level of the cryptographic hash tree 200, l=3) are based on respective verification keys 206 of an OTS scheme, and each verification key 206 is based on a respective signing key 202 of the OTS scheme. Respective signing keys 202 and verification keys 206 may form signing/verification key pairs of the MSS. For instance, $X_0$ is a first signing key of the OTS scheme and $Y_0$ is a first verification key that is based on the first signing key $X_0$, and ($X_0$, $Y_0$) may be considered a first signing/verification key pair of the OTS scheme. Likewise, $X_1$ is a second signing key of the OTS scheme and $Y_1$ is a second verification key that is based on the second signing key $X_1$, and ($X_1$, $Y_1$) may be considered a second signing/verification key pair of the OTS scheme. The lowest-level node $A_0^3$ is based on the verification key $Y_0$, and lowest-level node $A_1^3$ is based on the verification key $Y_1$. In the example shown, each lowest-level node 210 is based on the output of a hash function 208 applied to a respective verification key 206. Each respective verification key 206 is based on the output of a function 204 applied to a respective signing key 202.

The hash function 208 may be any suitable secure hash function. A secure hash function may be implemented by a hash function that is generally pre-image resistant or second pre-image resistant. An example secure hash function used by hash function 208 may be the SHA-256 function or SHA3-256 function. In some implementations, the hash function 208 produces an output that is smaller than an input to the hash function 208. For instance, referring to FIG. 2, each lowest-level node 210 may be smaller in size (e.g., 32 bytes) than the verification keys 206 (e.g., 16 kB) upon which it is based. The function 204 may be any suitable function that takes a signing key 202 for an OTS scheme as input and generates a verification key 206 of the OTS as output. In some implementations, the function 204 produces an output that is the same size as an input to the function 204. For instance, referring to FIG. 2, each signing key 202 may be the same size as the verification keys 206 associated therewith (e.g., 16 kB). The function 204 may be a different function from the hash function 208, or may be the same function as hash function 208.

In some instances, the function 204 includes the application of a hash function. The hash function may be a secure hash function as described above. For example, in a Lamport-Diffie OTS scheme, the verification keys 206 are based on the output of a hash function applied to respective signing keys 202. In a Lamport-Diffie OTS scheme, each signing key 202 may comprise a set of random values, wherein each random value is associated with a respective bit position of the output of a hash function (the digest) applied to the message being digitally signed. Each random value is based on whether the respective bit position of the digest is of value 0 or 1. The verification key is based on the output of a hash function applied to respective random values of the set of random values in the signing key. The Lamport-Diffie OTS is generated using the signing key, and is based on the values of respective bit positions of the digest of the message being digitally signed. The OTS thus comprises the set of random values in the signing key that correspond to the values of the respective bit positions of the digest. To verify the OTS, the same hash function used to generate the verification key is applied to the respective random values in the OTS, and the output is compared to the values in the verification key.

In some instances, the function 204 includes the application of a hash function multiple times. The hash function may be a secure hash function as described above. For example, in a Winternitz OTS scheme, the verification keys 206 are based on the output of a hash function applied multiple times to the signing keys 202. In a Winternitz OTS scheme, each signing key comprises a set of random values, with each random value being associated with multiple bit positions of the message being signed. The verification key is based on the output of the hash function applied multiple times to respective random values of the signing key. The Winternitz OTS is generated by applying a hash function one or more times to the random value associated with the respective set of bit positions of the message being signed. The number of times the hash function is applied may depend on the value of the bits in set of bit positions. To verify the OTS, the same hash function used to generate the verification key is applied one or more times to the OTS, and an output is compared to the verification key. The number of times the hash function is applied to the OTS may depend on the value of the bits in set of bit positions. Other OTS schemes are contemplated and may be used with implementations of the present disclosure.

The nodes of the cryptographic hash tree 200 other than the lowest-level nodes 210 are based on the application of a hash function to a combination of the two nodes at the level below that particular node. The hash function may be a different hash function from hash function 208, or may be the same hash function as hash function 208. The hash function may be a secure, publicly-known hash function, and may be applied to a combination of the two nodes below in any suitable manner. For example, the value of a node at level l=2 may be determined by applying a hash function to the concatenation of the values of the two nodes directly below it at the level l=3 (e.g., $A_0^2 = h(A_0^3 \| A_1^3)$, where $\|$ refers to concatenation). Other manners of determining the values of the cryptographic hash tree nodes are contemplated as well, and may be used with implementations of the present disclosure.

The cryptographic hash tree 200 may be used in conjunction with an OTS scheme to authenticate a verification key sent in a digital signature. For example, referring to FIG. 2, a signing node may use the signing key $X_0$ to generate an OTS for a message. The signing node may then send the OTS, an index indicating that the signing key $X_0$ was used, the verification key $Y_0$ associated with the signing key $X_0$, and an authentication path in the cryptographic hash tree to a recipient (e.g., in a digital signature accompanying a message), and the recipient may authenticate the verification key using the authentication path and a public key. In some instances, the public key is the root node 216 of the cryptographic hash tree 200, and the authentication path includes a set of nodes in the cryptographic hash tree 200 that are used to authenticate the verification key by comparing the public key to an output of a hash function applied one or more times to the verification key. For example, where the root node 216 of the cryptographic hash tree 200 is the public key, the authentication path for the signing/verification key pair ($X_0$, $Y_0$) is the set of values for nodes ($A_1^3$, $A_1^2$, $A_1^1$), since each of those nodes are needed to authenticate the verification key $Y_0$ against the public key (root node 216, $A_0^0$). More specifically, to authenticate the verification key $Y_0$, the recipient in this example would apply a known hash function to the verification key $Y_0$ sent with the message to yield the value of node $A_0^3$. The recipient would then use the values of nodes $A_1^3$, $A_1^2$, and $A_1^1$ to determine a value for the root node $A_0^0$. This may be done, for example, by determining the value for $A_0^2$ by applying a hash function to a concatenation of the values of nodes $A_0^3$ and $A_1^3$, determining the value for $A_0^1$ by applying a hash function to a concatenation of the values of nodes $A_0^2$ and $A_1^3$, and determining the value for $A_0^0$ by applying a hash function to a concatenation of the values of nodes $A_0^1$ and $A_1^1$. The determined value of $A_0^0$ may then be compared to the value of the public key, and if the values match then the verification key is authenticated.

In some cases, the cryptographic hash tree 200 may have a large number of levels (e.g., with a height of approximately 20 levels), and may be too large to be entirely loaded into the volatile memory of a signing node. Thus, portions of the cryptographic hash tree 200 may need to be kept in non-volatile memory during digital signing operations. To keep track of which signing/verification pairs have been used already (since a signing key of an OTS scheme should not be used more than once), a state variable or index may be used. A main state variable may reside in the volatile memory with the portion of the cryptographic hash tree currently being used to sign messages (the one loaded into the volatile memory). In normal operation, the main state variable is synchronized with a state variable residing in the non-volatile memory. However, a failure event (e.g., a system crash, power loss, memory failure, or the like) may occur that prevents the synchronization of the main state variable value in the volatile memory to the state variable value in the non-volatile memory. When this happens, the main state variable value is lost and the system may not be able to determine whether certain signing/verification key pairs have been used.

In addition to these issues, management of the state variable may be inefficient, for example, in an MSS with a large cryptographic hash tree, or with implementations involving distributed computing with multiple computational units. In some examples, the computational units are threads run in a processor (having one or more cores), cores of a processor, processor units, or physical computer systems. As an example, multiple computer systems may use a single cryptographic hash tree of an MSS to generate and verify digital signatures. In such implementations, the state variable may need to be shared among each of the computer systems in order to avoid using the same signing/verification keys twice. Real-time sharing and updating of the state variable among the various computer systems may be inefficient in some instances.

Accordingly, in some implementations, subtrees 214 of the example cryptographic hash tree 200 shown in FIG. 2 are generated based on a cut-off level 213. The example cut-off level 213 shown in FIG. 2 is the level of the cryptographic hash tree 200 at and below which the subtrees 214 are defined. The cut-off level 213 may be at any level below the level of the root node 216 (l>0). For instance, in the example shown, the cut-off level 213 is l=2, and the subtrees 214 comprise the nodes of the cryptographic hash tree at and below level l=2 (levels l=2, 3). The subtrees 214 are generated based on the cut-off level 213, with each subtree 214 including a subtree root node 212 at the cut-off level 213 and each of the nodes below the subtree root node 212. For example, referring to FIG. 2, the subtree 214a includes the node $A_0^2$ at the cut-off level 213 (the subtree root node of subtree 214a), and each node below node $A_0^2$ (nodes $A_0^3$ and $A_1^3$). Although the subtrees 214 illustrated in FIG. 2 include nodes at levels l=2, 3, the cryptographic hash tree 200 may also be divided into subtrees that include nodes at levels l=1, 2, 3 (with a cut-off level l=1), or subtrees that include only nodes at level l=3 (with a cut-off level l=3).

In some implementations, subtree data representing the subtrees 214 may be used in the implementation of an MSS. The subtree data may include one or more nodes of the subtree 214. The subtree data may also include the signing/verification keys associated with the subtree 214. The subtree data for each subtree 214 may be stored independently, and certain subtree data may be loaded into volatile memory during implementation of the MSS instead of the full cryptographic hash tree and all signing/verification keys. This may reduce the usage of volatile memory resources during implementation of an MSS, as signing and verification keys for the MSS and cryptographic hash trees with many levels may occupy a substantial amount of space in volatile memory. Usage of subtree data may also reduce the need to synchronize the state of which signing/verification key pairs associated with the subtree have been used in the MSS. The subtree data may be stored and used as described below with respect to FIGS. 3-4.

Figure 3:
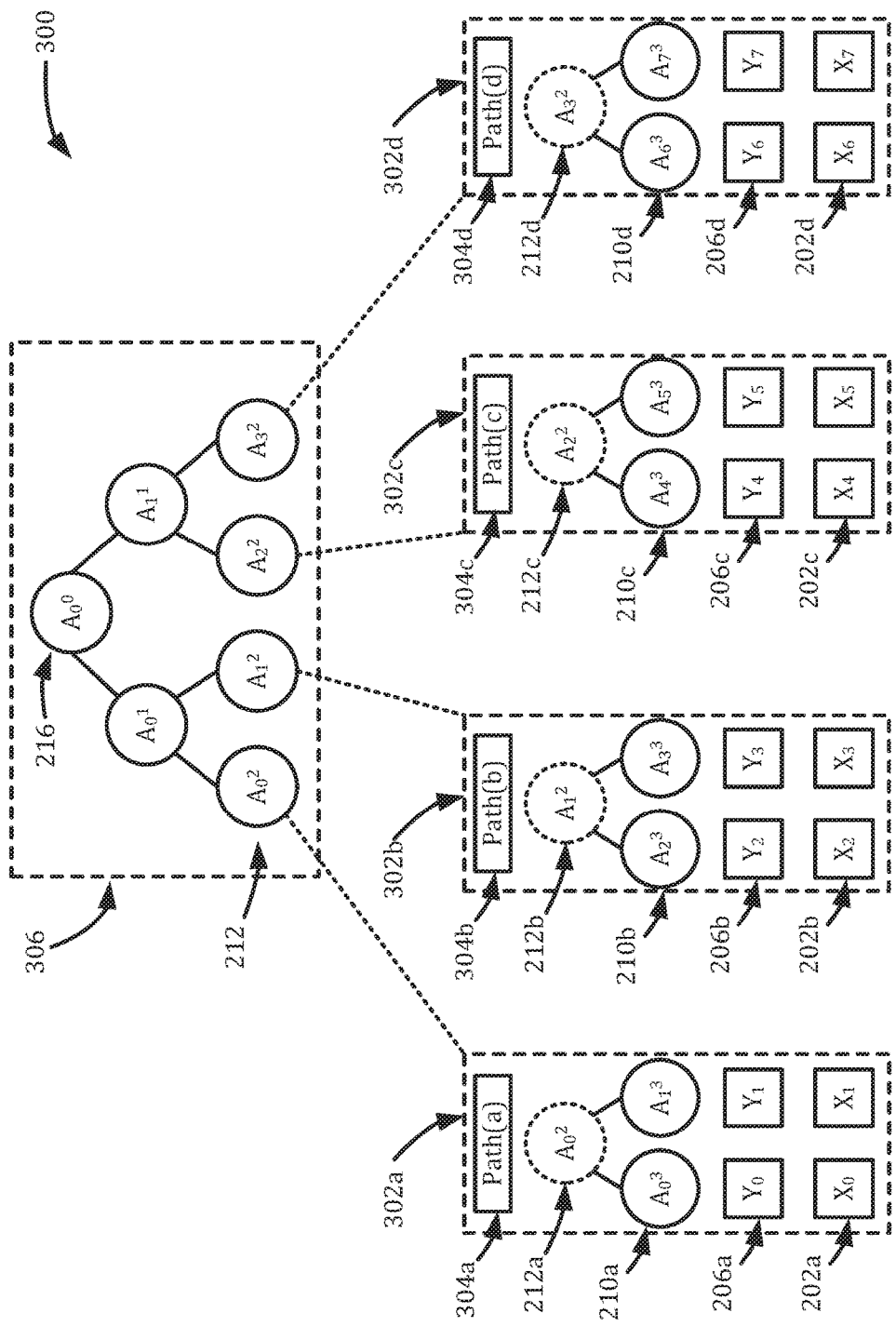
FIG. 3 is a diagram showing an example storage arrangement of a cryptographic hash tree for use with an MSS.

FIG. 3 is a diagram showing an example storage arrangement 300 of a cryptographic hash tree for use with an MSS. In the example shown, the storage arrangement 300 relates to the cryptographic hash tree 200 of FIG. 2, and illustrates an example manner for storing the cryptographic hash tree 200 in a memory (e.g., a volatile memory, a non-volatile memory, or a combination thereof) of a signing node in a communications system. In the example shown, subtree data representing respective subtrees 214 of the cryptographic hash tree 200 is separated and stored independently from one another. Subtree data may include information that may be used to construct a particular subtree 214, and may include data representing the particular subtree 214 (e.g., one or more nodes of the subtree 214, such as lowest-level nodes 210) along with authentication path portion information 304 associated with the particular subtree 214 (e.g., nodes outside the subtree 214, such as in the top portion 306). In the example shown, the subtree data for each subtree 214 includes the lowest-level nodes 210 of the subtree 214 (the nodes below the subtree root node 212), the signing keys 202 and verification keys 206 associated with the subtree 214, and the authentication path portion information 304 associated with the subtree 214. The subtree data for each subtree 214 may be stored in a separate data unit 302 as illustrated. In some implementations, the subtree data also includes the subtree root nodes 212.

Although illustrated in FIG. 3, in some instances, the top portion 306 of the cryptographic hash tree 200 (the subtree root nodes 212 and above) is not stored in the memory of a signing node, and the authentication path portion information 304 associated with each subtree 214 may include the set of nodes in the top portion 306 that are needed to determine the value of a public key node (e.g., the root node 216) in the top portion 306 when a signing/verification key pair associated with that subtree 214 is used in the MSS. For example, where one of the verification keys 206a of subtree 214a is used, the authentication path portion information 304a may store the nodes in the cryptographic hash tree needed to determine the value of the root node 216 from one of the lowest-level nodes 210a. However, in some instances, the top portion 306 may be stored as its own data unit in the memory along with data units 302. Where the top portion 306 is stored in the memory, the authentication path portion information 304 may include an identifier (e.g., a file path)

that indicates where in the memory the top portion 306 is stored. The set of nodes in the top portion 306 needed to determine the value of the public key node used for authentication may then be determined by accessing the top portion 306 in the memory.

In some implementations, each data unit 302 is stored in a non-volatile memory of a signing node, and one or more (but not all) data units 302 may be loaded into a volatile memory of the signing node for use in generating digital signatures in accordance with the MSS. For example, the signing node may load the data unit 302*a* (including the lowest-level nodes 210*a* of subtree 214*a*, the authentication path portion information 304*a*, the signing keys 202*a*, and the verification keys 206*a*) into its volatile memory from its non-volatile memory, and may use the signing keys 202*a* and verification keys 206*a* to generate digital signatures for messages. The data units 302*b*, 302*c*, and 302*d* may remain in the non-volatile memory of the signing node during this time. When the signing node has used each signing key 202*a* in the data unit 302*a*, another data unit 302 may be loaded into the volatile memory from the non-volatile memory. In some instances, the signing node may delete the data unit 302*a* from the non-volatile memory upon loading the data unit 302*a* into the volatile memory. In some instances, the signing node may delete the data unit 302*a* from the non-volatile memory in response to loading the next data unit from the non-volatile memory into the volatile memory.

In some implementations, the cryptographic hash tree 200 may be used by multiple computational units simultaneously to generate and verify digital signatures, and each computational unit may independently use subtree data in data units 302. For example, the signing node may include a processor that has multiple cores, and each core of the processor may utilize a particular data unit 302 independently of one another to generate and verify digital signatures. As another example, a communications system may include multiple service computer systems that act as a signing entity for and MSS, and each computer system may utilize particular data units 302 independently of other computer systems to generate digital signatures. In some instances, the signing entity may generate the cryptographic hash tree 200 and data units 302, and distribute the data units 302 to each of the computer systems. In some implementations, each computer system of the signing entity may generate lowest-level nodes 210 of the cryptographic hash tree 200 using signing/verification key pairs distributed thereto, and the computer system may report its respective lowest-level nodes 210 to construct the full cryptographic hash tree 200. As yet another example, a signing entity may have multiple computer systems for redundancy purposes, and each computer system may utilize particular data units 302 independently of one another such that failure of one computer system does not halt the usage of the MSS for the signing entity.

In some implementations, a public key for the MSS includes multiple nodes of the top portion 306, and the top portion 306 is not stored at the signing node. By including multiple nodes of the cryptographic hash tree 200 in the public key, the size of digital signatures in the MSS may be reduced, since nodes of the authentication path residing in the public key need not be transmitted along with the digital signature. This may translate into a savings of computational resources, bandwidth resources, or both. A node of the public key may be used in authenticating verification keys of the MSS as described below. In some instances, the public key node used for authentication is the root node 216. In some instances, the public key node used for authentication is a node in the top portion 306 other than the root node 216. In some instances, the public key includes each of the nodes in the top portion 306, and the public key thus contains n nodes of the cryptographic hash tree:

$$n = d \times \sum_{i=0}^{l} 2^i$$

where d represents the size of the digest of the hash function used in generating the cryptographic hash tree 200, and l represents the cut-off level. In some instances, the public key includes only the root node 216 and the subtree root nodes 212, and the public key thus contains n nodes of the cryptographic hash tree:

$$n = d \times (2^l + 1)$$

where d represents the size of the digest of the hash function used in generating the cryptographic hash tree 200, and l represents the cut-off level. In some instances, the public key includes only the subtree root nodes 212.

Figure 4:
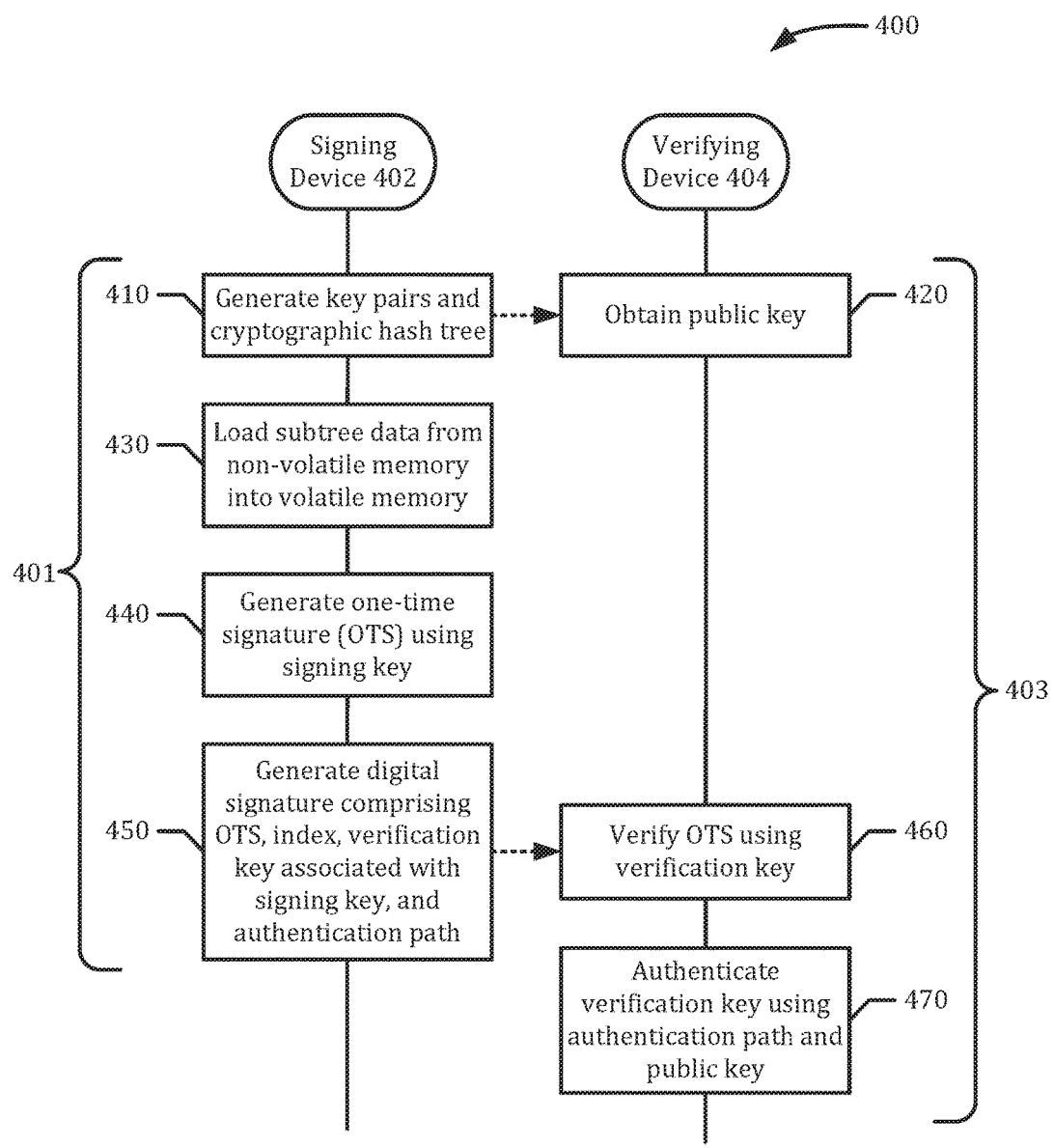
FIG. 4 is a flow diagram showing an example process for generating and verifying a digital signature in an MSS.

FIG. 4 is a flow diagram showing an example process 400 for generating and verifying a digital signature in an MSS. The example process 400 can be performed, for example, by computer systems that can exchange information over a communication channel. For instance, operations in the process 400 may be performed by the devices 102, 104 in the example communication system 100 shown in FIG. 1 or in another type of system. As an example, signing device 402 may be device 102 of FIG. 1 and verifying device 404 may be device 104 of FIG. 1. The example process 400 may include additional or different operations, and the operations may be performed in the order shown or in another order. In some cases, one or more of the operations shown in FIG. 4 are implemented as processes that include multiple operations, sub-processes or other types of routines. In some cases, operations can be combined, performed in parallel, iterated or otherwise repeated or performed in another manner. For instance, in the example shown, process 400 includes sub-process 401 performed by signing device 402 and sub-process 403 performed by verifying device 404.

The example process 400 generates a digital signature for messages in a communication system using an MSS that utilizes an OTS scheme and subtree data for subtrees of a cryptographic hash tree (e.g., digitally signing messages sent between devices 102, 104 of FIG. 1 using the subtrees 214 of cryptographic hash tree 200 of FIGS. 2-3). The example process 400 also verifies an OTS using a verification key of the OTS scheme, and authenticates the verification key using the cryptographic hash tree. In some instances, the process 400 is implemented in a manner that does not require the synchronization of a state variable between volatile and non-volatile memory to keep track of signing keys used in the MSS. In some instances, a public key for the MSS includes multiple nodes of the cryptographic hash tree, and the process 400 is implemented in a manner that conserves computational and/or bandwidth resources used in implementing the MSS. In some instances, the process 400 is implemented in a manner that allows for respective subtrees of a cryptographic hash tree to be used by different computational units in a distributed computing system. In some examples, the process 400 is secure against quantum-enabled adversaries such as, for example, the quantum-enabled adversary 108 shown in FIG. 1. The example process 400 may also provide security against classically-enabled adversaries who do not have access to quantum computers or other quantum resources. As illustrated in example shown in FIG. 4, 410, 430, 440, and 450 may be performed by a signing node 402 in a MSS, while 420, 460, and 470 may be performed by a verifying node 404 in the MSS.

At 410, the signing node 402 generates signing/verification key pairs of an OTS scheme, and generates a cryptographic hash tree for the MSS based on the verification key pairs. The signing/verification key pairs may be generated based on any suitable OTS scheme. For example, the signing/verification key pairs may be generated based on a Lamport-Diffie OTS scheme or a Winternitz OTS scheme. The cryptographic hash tree may be generated by first applying a hash function (e.g., the SHA-256 or SHA3-256 hash function) to the respective verification keys of the chosen OTS scheme. The output of the hash function may form the lowest-level nodes of the cryptographic hash tree, and the higher-level nodes of the cryptographic hash tree may be based on combinations of those lowest-level nodes, as described above.

At 420, the verifying node 404 obtains a public key of the MSS. The public key of the MSS may be received from the signing node 402 as illustrated in the example of FIG. 4, or may be received or otherwise obtained from a third party (e.g., a TTP, such as a certificate authority). The public key of the MSS may include one or more nodes of the cryptographic hash tree. In some implementations, the public key is the root node of the cryptographic hash tree. In some implementations, the public key includes the root node of the cryptographic hash tree and other nodes in the top portion of the cryptographic hash tree. For example, the public key may be the entire top portion of the cryptographic hash tree, from the subtree root nodes and above. As another example, the public key may be just the root node of the cryptographic hash tree and the subtree root nodes.

At 430, the signing node 402 loads subtree data from its non-volatile memory to its volatile memory. The subtree data represents a subtree of a cryptographic hash tree and a first authentication path portion that includes nodes outside the subtree. The subtree includes a subtree root node at a cut-off level and each node below the subtree root node (e.g., the subtree root node $A_0^2$ of the subtree 214a in FIGS. 2-3 and the nodes $A_0^3$ and $A_1^3$ below it), and the subtree data loaded into the volatile memory includes information that may allow the signing node 402 (or another node) to construct the subtree therefrom. For example, the subtree data loaded into the volatile memory may include a subset of the nodes of the subtree, and may be the nodes of the subtree below the subtree root node (e.g., for subtree 214a of FIGS. 2-3, the subtree data loaded into the volatile memory may include lowest-level nodes 210a ($A_0^3$ and $A_1^3$), but not the subtree root node 212 ($A_0^2$)). The subtree data may also include one or more nodes of the cryptographic hash tree outside the subtree, and may include a subtree root node of another subtree of the cryptographic hash tree (a node at the cut-off level). For example, for the subtree data associated with subtree 214a of FIGS. 2-3 may include nodes $A_1^2$ and $A_1^1$ (those nodes of the cryptographic hash tree needed to obtain the value of the root node $A_0^0$) along with the lowest-level nodes 210a ($A_0^3$ and $A_1^3$) below the subtree root node ($A_0^2$) of the subtree 214a. The subtree data may also include the signing/verification key pairs associated with the subtree. For example, the subtree data associated with subtree 214a of FIGS. 2-3 may include the signing keys 202a and the verification keys 206a along with the lowest-level nodes 210a and the first authentication path portion nodes $A_1^2$ and $A_1^1$.

By loading the subtree data in this manner, it may not be necessary to load the entire cryptographic hash tree into volatile memory, and the subtree data may be used independently of subtree data for other subtrees of the cryptographic hash tree. Furthermore, synchronization of a state variable (that tracks which signing/verification key pairs have been used) between volatile and non-volatile memory may not be necessary.

In some implementations, the subtree data for each subtree is stored together in the non-volatile memory as a data unit, and the data unit for a particular subtree may be loaded into the volatile memory as needed. For example, referring to FIG. 3, the data unit 302a hat includes the lowest-level nodes 210a for subtree 214a, the authentication path portion information 304a associated with the subtree 214a (which may be nodes in the top portion 306 or an identifier indicating where the top portion 306 is stored, as described above), the signing keys 202a, and the verification keys 206a may be loaded into volatile memory from non-volatile memory. The data unit may be deleted from the non-volatile memory upon being loaded into the volatile memory, or may be deleted from the non-volatile memory upon loading another data unit into the volatile memory (e.g., upon exhaustion of the signing/verification key pairs in the initial data unit).

In some implementations, the subtree data includes the nodes in the first authentication path portion. The first authentication path portion includes the nodes in a full authentication path outside the subtree. In some implementations, the first authentication path portion includes a subtree root node of another subtree. In some implementations, the first authentication path portion includes nodes at one or more levels above the subtree root node. A public key node may be used to authenticate the verification key as described further below. The nodes of the first authentication path portion may thus include the nodes needed to determine the value of the public key node used for authentication given the values of the nodes in the subtree and the verification key associated with a signing key used to generate an OTS for a digital signature. For example, referring to cryptographic hash tree 200 of FIGS. 2-3, if the signing key 202a ($X_0$) is used to generate an OTS for the digital signature, the full authentication path for the lowest-level node $A_0^3$ associated with the verification key 206a ($Y_0$) would be nodes ($A_1^3$, $A_1^2$, $A_1^1$). Because the subtree 214a includes the node $A_1^3$, the first authentication path portion associated with the subtree 214a would be nodes ($A_1^2$, $A_1^1$). In this example, the subtree data for subtree 214a may include lowest-level nodes 210a ($A_0^3$, $A_1^3$) and nodes ($A_1^2$, $A_1^1$).

In some implementations, the top portion of the cryptographic hash tree above the subtrees (e.g., top portion 306 of FIG. 3) is loaded into the volatile memory along with the subtree data, and the subtree data includes an identifier (e.g., for authentication path portion information 304 of FIG. 3) that indicates where in the volatile memory the top portion of the cryptographic hash tree is stored. The identifier may be a file path for the top portion, for example. The first authentication path portion for the subtree may then be determined using the top portion of the cryptographic hash tree, rather than storing separate authentication path portions for each subtree in the non-volatile memory along with its associated subtree. For example, referring to FIG. 3, the subtree data in data unit 302a may be loaded into the volatile memory along with the top portion 306, and the authentication path portion information 304a may include a file path indicating where the top portion 306 is stored. Because the top portion of the cryptographic hash tree is static, it may remain in the volatile memory as different subtree are loaded for use in digitally signing messages or removed after being exhausted. For example, when the signing/verification keys in data unit 302a are exhausted, data unit 302b may be loaded into the volatile memory (with its authentication path portion information 304b also including a file path indicating where the top portion 306 is stored). The top portion 306 may remain in the volatile memory when this occurs.

At 440, the signing node 402 generates an OTS using a signing key of the OTS scheme used in the MSS. The signing key may be part of the subtree data loaded into the volatile memory at 430. In some implementations, generating the OTS may include determining a value of a bit associated with the message being digitally signed, and choosing a random value of the signing key based on the value of the bit. The random values chosen may then be combined to form the OTS. For example, in a Lamport-Diffie OTS scheme, the OTS may be based on the message, or may be based on the output of a hash function (the digest) applied to the message being signed. In the signing key of a Lamport-Diffie OTS scheme, each bit position of the digest is assigned two random values associated therewith: a first value for a bit value of 0, and a second value for a bit value of 1. The OTS may be generated by choosing, for each bit of the message or digest, the random value of the signing key associated with that bit's value and position, and combining the chosen random values for each bit position of the message or digest.

In some implementations, generating the OTS may include applying a hash function one or more times to respective portions of the message or digest of the message being digitally signed. For example, in a Winternitz OTS scheme, the OTS may be based on the message, or may be based on the output of a hash function (the digest) applied to the message being signed. The OTS may be further based on a checksum combined with the digest in some instances. The signing key of the Winternitz OTS includes multiple random values that are respectively associated with multiple bit positions (a window size) of the message or digest. For example, each random value of the signing key may be associated with 4 bit positions of the digest. To generate the OTS, for each set of bit multiple positions, a number of hash functions is applied to the random value of the signing key associated with that bit position. The number of hash functions applied is based on the value of the bits in the respective bit positions. For instance, if the value of the 4 bits is 0000, then the hash function is applied once to the random value to determine the portion of the OTS for those bit positions. Likewise, if the value of the 4 bits is 0001, then the hash function is applied twice to the random value to determine the portion of the OTS for those bit positions.

At 450, the signing node 402 generates a digital signature, which includes the OTS, an index indicating which signing key was used at 440, a verification key associated with the signing key used at 440, and the full authentication path in the cryptographic hash tree associated with the verification key. The full authentication path associated with the verification key may include each node of the cryptographic hash tree needed to determine a value of a public key node (e.g., the root node of the cryptographic hash tree) given the signing/verification key pair used. For example, if the signing key 202a ($X_0$) is used to generate an OTS, the full authentication path for the lowest-level node $A_0^3$ associated with the verification key 206a ($Y_0$) would be ($A_1^3$, $A_1^2$, $A_1^1$). The full authentication path may include the first authentication path portion that includes nodes outside the subtree (as discussed above), and a second authentication path portion that includes nodes in the subtree. In the previous example, the first authentication path portion would include nodes $A_1^2$ and $A_1^1$, and the second authentication path portion would include node $A_1^3$.

The full authentication path may be determined by the signing node 402 using the subtree data loaded at 410. For example, where the subtree data includes the nodes of the first authentication path, the second authentication path portion may be determined using the nodes of the subtree in the subtree data. Using the previous example where the signing key 202a ($X_0$) is used to generate an OTS and the full authentication path is ($A_1^3$, $A_1^2$, $A_1^1$), the subtree data loaded into volatile memory may include the first authentication path portion ($A_1^2$, $A_1^1$). In this example, the second authentication path portion (the node $A_1^3$) would be determined using the lowest-level nodes 210a of the subtree 214a (which includes the node $A_1^3$) loaded into the volatile memory as part of the subtree data. As another example, where the top portion of the cryptographic hash tree is loaded into the volatile memory along with the subtree data, and the subtree data includes an identifier (e.g., a file path) indicating where in the non-volatile memory the top portion of the cryptographic hash tree is stored, the full authentication path may be determined using both the subtree data and the top portion of the cryptographic hash tree (after loading the top portion into the volatile memory from the non-volatile memory using the identifier in the subtree data). Using the example where the signing key 202a ($X_0$) is used to generate an OTS and the full authentication path is ($A_1^3$, $A_1^2$, $A_1^1$), the first authentication path portion (nodes $A_1^2$, $A_1^1$) would be determined by accessing (based on the identifier in the subtree data) the top portion 316 stored in the volatile memory, and the second authentication path portion (the node $A_1^3$) would be determined using the lowest-level nodes 210a of the subtree 214a (which includes the node $A_1^3$) loaded into the volatile memory as part of the subtree data.

The digital signature is then sent by the signing node 402 to the verifying node 404. A message associated with the digital signature may also be sent along with the digital signature, or may be sent separately from the digital signature.

At 460, the verifying node 404 receives the digital signature from the signing node 402 and verifies the OTS of the digital signature using the verification key. Verification of the OTS may include applying a hash function one or more times to the values of the OTS and comparing those values to values in the verification key sent with the digital signature. For example, where the Lamport-Diffie OTS scheme is used with the MSS, verification of the OTS includes applying a hash function to each random value of the OTS (each random value of the OTS being associated with a respective bit position of the digest of the message), and comparing the outputs of the hash function to the values in the verification key associated with the respective bit positions. As another example, where the Winternitz OTS scheme is used with the MSS, verification of the OTS includes applying a hash function one or more times to each value of the OTS (each value of the OTS being associated with multiple bit positions of the digest of the message) to yield an output, and comparing the output to the values in the verification key associated with the respective multiple bit positions. If the values of the output match the values of the verification key, then the OTS is determined to be verified.

At 470, the verifying node 404 authenticates the verification key in the digital signature using the full authentication path and the public key obtained at 420. This may include determining a particular value using the verification key and the nodes in the full authentication path, and comparing that particular value to a value of a public key node of the cryptographic hash tree. This may include applying a hash function one or more times to the verification key, with the number of times the hash function is applied being based on the cryptographic hash tree. For example, where the signing key $X_0$ is used to generate the OTS and the public key node used for authentication is the root node $A_0^0$ of the cryptographic hash tree, the verifying node 404 may apply a hash function to the verification key $Y_0$ to determine the value of the node $A_0^3$. The verifying node 404 may then apply a hash function to the value of $A_0^3$ concatenated with the value of node $A_1^3$ (which was included in the full authentication path sent with the digital signature) to determine the value of the node $A_0^2$. The verifying node 404 may then apply a hash function to the value of $A_0^2$ concatenated with the value of node $A_1^2$ (which was also included in the full authentication path sent with the digital signature) to determine the value of the node $A_0^1$. The verifying node may then apply a hash function to the value of $A_0^1$ concatenated with the value of node $A_1^1$ (which was also included in the full authentication path sent with the digital signature) to determine the value of the node $A_0^0$. The verifying node 404 may then compare the determined value of the node $A_0^0$ to a value of the public key, and if the values match, then the verifying node 404 determines that the verification key $Y_0$ sent with the digital signature is authentic.

If a failure event occurs at any time during process 400, the subtree data that is loaded in the volatile memory may be lost (due to the properties of the volatile memory). The failure event may be any event that causes the data in the volatile memory to be lost, and may include an unexpected loss of power to the signing node or to the volatile memory, a failure in the volatile memory itself, a crash of the operating system for the signing node, or the like. In the case of such a failure event, the signing entity in the MSS (e.g., signing device 402) may disregard the lost subtree data (and any unused signing/verification key pairs associated therewith) and subtree data associated with another subtree may be loaded from the non-volatile memory into the volatile memory. For example, referring to FIG. 3, if the data unit 302*a* is currently loaded into the volatile memory and a failure event occurs, then the data unit 302*b* may be loaded into the volatile memory and any unused signing keys 202*a* would be abandoned.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an internetwork (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, subtree data is used to generate digital signatures in an MSS.

In a first example, subtree data is loaded from a non-volatile memory into a volatile memory. The subtree data represents one or more nodes of a subtree of a cryptographic hash tree and a first authentication path portion that includes nodes outside the subtree. The subtree includes a subtree root node at a level below a root node of the cryptographic hash tree and lowest-level nodes of the cryptographic hash tree, which are based on respective verification keys for a one-time signature (OTS) scheme. By operation of one or more processors coupled to the volatile memory, an OTS is generated using a first signing key associated with a first verification key, which is associated with a lowest-level node in the subtree. The OTS, the first verification key, the first authentication path portion, and a second authentication path portion comprising one or more nodes of the subtree are sent to a recipient.

Implementations of the first example may include one or more of the following features. The subtree data may include nodes of the subtree at one or more levels below the subtree root node. The subtree data may include signing keys and verification keys associated with respective lowest-level nodes of the subtree. The subtree data may include nodes of the first authentication path portion. The subtree may be a first subtree of the cryptographic hash tree, the subtree root node may be a first subtree root node, and the first authentication path portion may include a second subtree root node of a second subtree of the cryptographic hash tree. The subtree data may include an identifier indicating a location in the volatile memory at which a top portion of the cryptographic hash tree is stored, and the top portion of the cryptographic hash tree may include the subtree root node and a public key node at or above a level of the subtree root node. The public key node may be the root node of the cryptographic hash tree. The public key node may be a node of the cryptographic hash tree at or above a level of the subtree root node.

Implementations of the first example may include one or more of the following features. The subtree data may be deleted from the non-volatile memory in response to the subtree data being loaded into the volatile memory. The subtree data may be first subtree data representing one or more nodes of a first subtree of the cryptographic hash tree, and second subtree data may be loaded from the non-volatile memory into the volatile memory, with the second subtree data representing nodes of a second subtree of the cryptographic hash tree. The first subtree data may be deleted from the volatile memory in response to the second subtree data being loaded into the volatile memory. In response to a failure in the volatile memory, the second subtree data may be loaded from the non-volatile memory into the volatile memory.

Implementations of the first example may include one or more of the following features. The first signing key may include a set of random values and the first verification key may include outputs of a hash function applied to respective random values of the signing key. Each random value of the set of random values may be associated with a respective bit position of a digest of the message.

Implementations of the first example may include one or more of the following features. The first signing key may include a set of random values and the first verification key may include outputs of a hash function applied multiple times to respective random values of the signing key. Each random value of the set of random values may be associated with multiple bit positions of a digest of the message.

Implementations of the first example may include one or more of the following features. The volatile memory may be a first volatile memory of a first computational unit, the subtree data may be first subtree data representing one or more nodes a first subtree of the cryptographic hash tree, the OTS may be a first OTS, and the recipient may be a first recipient. Second subtree data may be loaded from a non-volatile memory of a second computational unit into a volatile memory of the second computational unit. The second subtree data may represent one or more nodes of a second subtree of the cryptographic hash tree below and a third authentication path portion that includes nodes outside the second subtree. By operation of one or more processors coupled to the second volatile memory, a second OTS may be generated using a second signing key associated with a second verification key, which is associated with a lowest-level node in the second subtree. The second OTS, the second verification key, the third authentication path portion, and a fourth authentication path portion comprising one or more nodes of the second subtree are sent to a recipient.

In a second example, a public key is obtained, and a verification key and authentication path are received. The public key includes nodes of a cryptographic hash tree at one or more levels below a root node of the cryptographic hash tree, and the cryptographic hash tree includes lowest-level nodes that are based on respective verification keys for a one-time signature scheme. The authentication path includes nodes of the cryptographic hash tree other than a lowest-level node of the cryptographic hash tree associated with the verification key. By operation of one or more processors, the verification key is authenticated using the authentication path and the public key.

Implementations of the second example may include one or more of the following features. The public key may include the root node of the cryptographic hash tree. The lowest-level node of the cryptographic hash tree associated with the verification key may belong to a subtree of the cryptographic hash tree, and the public key may include a subtree root node of the subtree. Authenticating the verification key may include applying a hash function one or more times to the verification key to yield an output, and comparing the output to a node of the public key.

In some implementations, a computing system includes a data processing apparatus and a computer-readable medium storing instructions that are operable when executed by the data processing apparatus to perform one or more operations of the first example or the second example or both. In some implementations, a computer-readable medium stores instructions that are operable when executed by a data processing apparatus to perform one or more operations of the first example or the second example or both.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method for cryptographic communications in a distributed computing system comprising multiple computational units, the method comprising:
    generating a cryptographic hash tree comprising multiple subtrees and storing the cryptographic hash tree in non-volatile memory, wherein generating the cryptographic hash tree comprises:
        based on a cut-off level below a root node of the cryptographic hash tree, generating a plurality of subtree data units in the non-volatile memory, each subtree data unit representing nodes of a respective subtree of the cryptographic hash tree and a first authentication path portion comprising nodes outside the subtree, the subtrees of the cryptographic hash tree each comprising a respective subtree root node at the cut-off level below the root node of the cryptographic hash tree and lowest-level nodes of the cryptographic hash tree, the lowest-level nodes being based on respective verification keys for a one-time signature (OTS) scheme,
    loading a first subtree data unit of the plurality of subtree data units from the non-volatile memory into a volatile memory of a first computational unit in the distributed computing system;
    based on the first subtree data unit in the volatile memory of the first computational unit, by operation of one or more processors coupled to the volatile memory of the first computational unit, generating a first OTS using a first signing key associated with a first verification key, the first verification key being associated with a lowest-level node in a first subtree represented by the first subtree data unit;
    generating a first digital signature of a message based on the first subtree data unit, the first digital signature comprising: the first OTS, the first verification key, the first authentication path portion associated with the first subtree, and a second authentication path portion comprising one or more nodes of the first subtree; and
    transmitting the first digital signature based on the first subtree data unit, over a communication network, from the first computational unit to a recipient node, wherein the first digital signature based on the first subtree data unit is used by the recipient node to verify the sender of the message.

2. The method of claim 1, wherein the subtree data units each comprise nodes of a subtree at one or more levels below its subtree root node.

3. The method of claim 1, wherein the subtree data units each comprise signing keys and verification keys associated with respective lowest-level nodes of the subtree represented by the subtree data unit.

4. The method of claim 1, wherein the subtree data units each comprise nodes of the first authentication path portion.

5. The method of claim 1, wherein the first authentication path portion of the first subtree data unit includes a subtree root node of a second subtree of the cryptographic hash tree.

6. The method of claim 1, wherein the subtree data units each comprise an identifier indicating a memory location at which a top portion of the cryptographic hash tree is stored, and the top portion of the cryptographic hash tree comprises the subtree root nodes for the respective subtrees of the cryptographic hash tree and a public key node at or above a level of the subtree root nodes in the top portion.

7. The method of claim 6, wherein the public key node is the root node of the cryptographic hash tree.

8. The method of claim 6, wherein the public key node is a node of the cryptographic hash tree at or above a level of the subtree root nodes.

9. The method of claim 1, comprising deleting the first subtree data unit from the non-volatile memory in response to the first subtree data unit being loaded into the volatile memory.

10. The method of claim 1, wherein the method comprises:
    loading a second subtree data unit from the non-volatile memory into the volatile memory, the second subtree data unit representing nodes of a second subtree of the cryptographic hash tree; and
    deleting the first subtree data unit from the volatile memory in response to the second subtree data unit being loaded into the volatile memory.

11. The method of claim 1, wherein the method comprises, in response to a failure in the volatile memory, loading a second subtree data unit from the non-volatile memory into the volatile memory, the second subtree data unit representing nodes of a second subtree of the cryptographic hash tree.

12. The method of claim 1, wherein the cut-off level is level two or lower.

13. A distributed computer system comprising:
processors of multiple computational units; and
computer-readable storage media storing instructions that are operable when executed by the processors to perform operations comprising:
generating a cryptographic hash tree comprising multiple subtrees and storing the cryptographic hash tree in non-volatile memory. wherein generating the cryptographic hash tree comprises:
based on a cut-off level below a root node of the cryptographic hash tree, generating a plurality of subtree data units in the non-volatile memory, each subtree data unit representing nodes of a respective subtree of the cryptographic hash tree and a first authentication path portion comprising nodes outside the subtree, the subtrees of the cryptographic hash tree each comprising a respective subtree root node at the cut-off level below the root node of the cryptographic hash tree and lowest-level nodes of the cryptographic hash tree, the lowest-level nodes being based on respective verification keys for a one-time signature (OTS) scheme;
loading a first subtree data unit of the plurality of subtree data units from the non-volatile memory into a volatile memory of a first computational unit of the multiple computational units;
based on the first subtree data unit in the volatile memory of the first computational unit, generating a first OTS using a first signing key associated with a first verification key, the first verification key being associated with a lowest-level node in a first subtree represented by the first subtree data unit;
generating a first digital signature of a message based on the first subtree data unit, the first digital signature comprising: the first OTS, the first verification key, the first authentication path portion associated with the first subtree, and a second authentication path portion comprising one or more nodes of the first subtree; and
transmitting the first digital signature based on the first subtree data unit, over a communication network, from the first computational unit to a recipient node, wherein the first digital signature is used by the recipient node to verify a sender of the message.

14. The system of claim 13, wherein the subtree data units each comprise nodes of a subtree at one or more levels below its subtree root node.

15. The system of claim 13, wherein the subtree data units each comprise signing keys and verification keys associated with respective lowest-level nodes of the subtree represented by the subtree data unit.

16. The system of claim 13, wherein the subtree data units each comprise nodes of the first authentication path portion.

17. The system of claim 13, wherein the first authentication path portion of the first subtree data unit includes a subtree root node of a second subtree of the cryptographic hash tree.

18. The system of claim 13, wherein the subtree data units each comprise an identifier indicating a memory location at which a top portion of the cryptographic hash tree is stored, and the top portion of the cryptographic hash tree comprises the subtree root nodes for the respective subtrees of the cryptographic hash tree and a public key node at or above a level of the subtree root nodes in the top portion.

19. The system of claim 18, wherein the public key node is the root node of the cryptographic hash tree.

20. The system of claim 18, wherein the public key node is a node of the cryptographic hash tree at or above a level of the subtree root nodes.

21. The system of claim 13, wherein the operations comprise deleting the first subtree data unit from the non-volatile memory in response to the first subtree data unit being loaded into the volatile memory.

22. The system of claim 13, wherein the operations comprise:
loading a second subtree data unit from the non-volatile memory into the volatile memory, the second subtree data unit representing nodes of a second subtree of the cryptographic hash tree; and
deleting the first subtree data unit from the volatile memory in response to the second subtree data unit being loaded into the volatile memory.

23. The system of claim 13, wherein the operations comprise, in response to a failure in the volatile memory, loading a second subtree data unit from the non-volatile memory into the volatile memory, the second subtree data unit representing nodes of a second subtree of the cryptographic hash tree.

24. A method for cryptographic communications over a communication network, comprising:
receiving a public key, the public key comprising multiple levels of a cryptographic hash tree, the multiple levels including one or more levels below a root node of the cryptographic hash tree, the cryptographic hash tree comprising lowest-level nodes based on respective verification keys for a one-time signature scheme;
receiving, over the communication network, a one-time signature (OTS), a verification key and an authentication path, the OTS representing a digital signature of a message, the authentication path comprising one or more nodes of the cryptographic hash tree other than a lowest-level node of the cryptographic hash tree associated with the verification key, each of the nodes in the authentication path being at a level of the cryptographic hash tree below a lowest level of the nodes of the public key, and a message associated with the digital signature;
by operation of one or more processors, using the verification key to verify the OTS;
by operation of the one or more processors, authenticating the verification key using the authentication path, wherein the verification key is authenticated to a node at the lowest level of the public key, the authentication being performed independent of the root node of the cryptographic hash tree; and
determining whether a sender of the message associated with the digital signature is verified based on verifying the OTS and authenticating the verification key.

25. The method of claim 24, wherein the public key comprises the root node of the cryptographic hash tree.

26. The method of claim 24, wherein the lowest-level node of the cryptographic hash tree associated with the verification key belongs to a subtree of the cryptographic hash tree, and the public key comprises a subtree root node of the subtree.

27. The method of claim 24, wherein authenticating the verification key comprises:

applying a hash function one or more times to the verification key to yield an output; and comparing the output to a node of the public key.

28. A computer system comprising:

a data processing apparatus; and a computer-readable storage medium storing instructions that are operable when executed by the data processing apparatus to perform operations comprising:

receiving a public key, the public key comprising multiple levels of a cryptographic hash tree, the multiple levels including one or more levels below a root node of the cryptographic hash tree, the cryptographic hash tree comprising lowest-level nodes based on respective verification keys for a one-time signature scheme;

receiving, over the communication network, a one-time signature (OTS), a verification key and an authentication path, the OTS representing a digital signature of a message, the authentication path comprising one or more nodes of the cryptographic hash tree other than a lowest-level node of the cryptographic hash tree associated with the verification key, each of the nodes in the authentication path being at a level of the cryptographic hash tree below a lowest level of the nodes of the public key, and a message associated with the digital signature;

using the verification key to verify the OTS;

authenticating the verification key using the authentication path, wherein the verification key is authenticated to a node at the lowest level of the public key, the authentication being performed independent of the root node of the cryptographic hash tree; and determining whether a sender of the message associated with the digital signature is verified based on verifying the OTS and authenticating the verification key.

29. The system of claim 28, wherein the public key comprises the root node of the cryptographic hash tree.

30. The system of claim 28, wherein the lowest-level node of the cryptographic hash tree associated with the verification key belongs to a subtree of the cryptographic hash tree, and the public key comprises a subtree root node of the subtree.

31. The system of claim 28, wherein authenticating the verification key comprises:

applying a hash function one or more times to the verification key to yield an output; and comparing the output to a node of the public key.

* * * * *

UNITED STATES PATENT AND TRADEMARK OFFICE
CERTIFICATE OF CORRECTION

PATENT NO. : 10,116,450 B1
APPLICATION NO. : 15/341499
DATED : October 30, 2018
INVENTOR(S) : Brown et al.

Page 1 of 1

It is certified that error appears in the above-identified patent and that said Letters Patent is hereby corrected as shown below:

In the Specification

In Column 3, Line 1, delete "m units." and insert -- methods, which may be inefficient in distributed computing systems with multiple computational units. -- therefor.

In the Claims

In Column 23, Line 13, Claim 13, delete "memory." and insert -- memory, -- therefor.

Signed and Sealed this
Fifteenth Day of January, 2019

Andrei Iancu
*Director of the United States Patent and Trademark Office*